Aug. 4, 1942.   W. R. NEW   2,291,828
TURBINE BLADING
Filed May 4, 1940
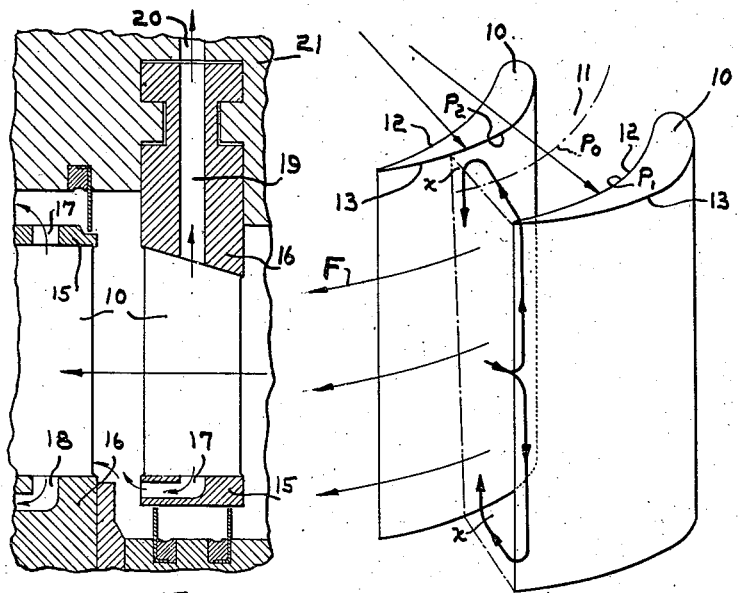
FIG. 1.
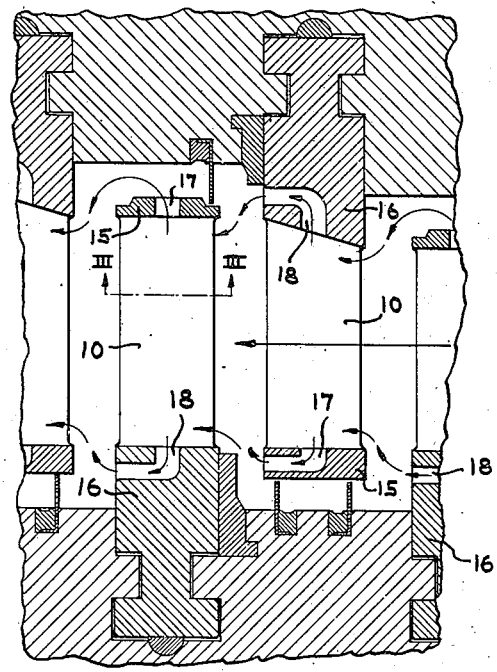
FIG. 4.
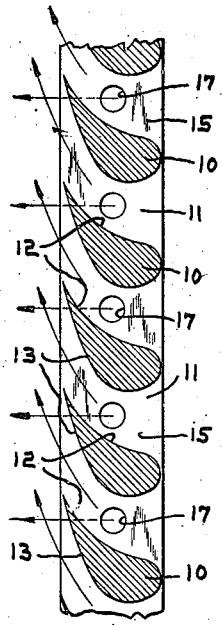
FIG. 3.
FIG. 2.
WITNESSES:
James K. Mosier
E. H. Lutz
INVENTOR
WINSTON R. NEW.
BY
a. B. Reavis
ATTORNEY Patented Aug. 4, 1942

2,291,828

UNITED STATES PATENT OFFICE 2,291,828

TURBINE BLADING

Winston R. New, Springfield, Pa., assignor to Westinghouse Electric & Manufacturing Company, East Pittsburgh, Pa., a corporation of Pennsylvania Application May 4, 1940, Serial No. 333,266

7 Claims. (Cl. 253—77)

My invention relates to elastic fluid turbines and it has for an object to provide means for reducing energy losses attributable to secondary flow which occurs whenever a fluid is constrained to follow a curved path as in any turbine blade passage.

This and other objects are effected by my invention as will be apparent from the following description and claims taken in accordance with the accompanying drawing, forming a part of this application, in which:

Fig. 1 is an isometric view of a pair of turbine blade elements showing diagrammatically secondary flow in relation to the main or profile flow of the passage;

Fig. 2 is a detail view of a pair of adjacent blade rows modified to minimize the effects of secondary flow;

Fig. 3 is a fragmentary section taken along the line III—III of Fig. 2; and,

Fig. 4 is a detail view of a modification showing tapping off the secondary flow stream.

Secondary flow develops in any turbine blade passage in which fluid is constrained to move along a curved path and it is responsible for energy losses arising from eddy formations at the passage ends, the resultant vorticity destroying a part of the kinetic energy of translational flow which reverts non-isentropically to heat. Foil section blading with well-rounded inlet edges is advantageous, not principally for the reason that its maximum efficiency is equally as good as, or better than, sharp-inlet edge blading, but because it operates with better efficiency over a relatively wider range of velocity ratios. While with the foil type of blading, the profile losses are low as compared with those of the sharp-inlet edge type, the secondary loss may be relatively large and anything which will improve performance from the point of view of minimizing the effects of secondary loss will then give a decided improvement in the overall efficiency of the finite length of blade.

Secondary flow, always present in any curved passage through which a fluid is moving, owes its existence to the pressure difference, between the concave and convex bounding surfaces, established by the action of centrifugal force on the mass particles of the fluid. What is meant by secondary flow will be clear from a consideration of Figs. 1 and 3 showing adjacent blades 10 defining passages 11 through which passes the main or profile flow, also called profile flow, "F." The profile flow in the blade passages is constrained by the blades to flow in curved paths and centrifugal force is responsible for a higher pressure, $p_1$, at the concave blade face 12 than the pressure, $p_2$, at the convex blade face 13. Assuming that $p_0$ is the mean pressure of a passage, if $p_1$ and $p_2$ differ from $p_0$ by a large percentage of the latter, the secondary loss is bad and is decreased with decrease in this percentage. Hence, the secondary losses are measured, among other considerations, by deviation of the face pressures $p_1$ and $p_2$ from the mean pressure $p_0$.

The aforesaid pressure gradient sets up secondary flow inwardly and outwardly along the concave blade face toward the ends of the passage, then adjacent to the shrouding 15 and the circumferentially-abutting root and spacing portions 16 closing the ends of the passage to the convex face where the secondary flow tendency is from the ends inwardly substantially at right angles to the profile flow. Such a flow path is diagrammatically indicated by the arrowed line in Fig. 1. The principal energy losses localize in the regions "xx" at the ends of the passage and adjacent to the convex face, where the secondary flow re-enters the profile flow substantially at right angles, causing eddy formations at the passage ends. It is this vorticity which converts a part of the kinetic energy of translational or profile flow non-isentropically to heat.

While it is impossible to prevent the pressure difference responsible for secondary flow, it is possible to avoid to a large extent energy losses on that account, the best remedy being to minimize re-entry of flow at the passage ends adjacent to the convex faces. Accordingly, in Figs. 2 and 3, the shroud elements 15 and the root and spacing portions 16 have openings 17 and 18, respectively, for by-passing a portion of the secondary flow, thereby preventing the latter from re-entering the profile flow adjacent to the convex faces of the blades.

As shown in Fig. 2, secondary flow thus by-passed from a preceding row is supplied for flow through the passages of a succeeding row. Furthermore, the by-pass openings may be provided in either or both the shrouding and the root and spacing portions of each blade row. Preferably, however, such passages are provided in connection with the root and spacing portions of stationary rows and shrouding of moving rows.

Referring to Fig. 4, there is shown by-pass openings 19 provided in the root portions 16 of stationary blades and communicating with openings 20 provided in the housing or cylinder 21, the openings affording passages for the withdrawal of secondary flow to be used for any suitable purpose such as regenerative heating, process work and the like.

If the blades are unshrouded at the tip ends, the secondary losses thereat would, on that account, be minimized, however, such losses would still exist at the root portion ends of the passages. Hence, the invention is applicable in several ways: with shrouded blading, by-passing means may be provided for both ends of the passages of both the stationary and moving blades or only at the ends of such passages remote from the turbine axis; and, with unshrouded blades, the by-passing means may be employed with the root portion ends of the passages. The present invention is particularly advantageous in improving the efficiency of blading of the foil section type with well-rounded inlet edges because of the relatively larger pitch employed with blading of that type. Larger blade pitch generally augments secondary energy losses.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In an elastic-fluid turbine, means including blades defining curved flow passages having closed ends, the constrained curved fluid flow in said passages setting up higher pressure at the concave face of each passage than that at the convex face thereof and which pressure difference induces secondary flow along the concave face towards the ends of the passage, means including openings formed in the closed passage ends for by-passing secondary flow at the closed passage ends to minimize the re-entry of elastic fluid adjacent to the convex faces at the closed passage ends into the profile flow and substantially at right angles to the latter, and means providing for the utilization of available energy of the by-passed secondary flow elastic fluid and including the junction of by-passed secondary flow elastic fluid with the main flow between preceding and succeeding blade rows.

2. In an elastic-fluid turbine, means including blades of foil type having well-rounded inlet edges and defining curved flow passages closed at at least one end, the constrained curved fluid flow in said passages setting up higher pressure at the concave face of each passage than that at the convex face thereof and which pressure difference induces secondary flow along the concave face towards the ends of the passage, means including openings formed in the closed passage ends for by-passing secondary flow at the closed passage ends to minimize the re-entry of elastic fluid adjacent to the convex faces at such ends into the profile flow and substantially at right angles to the latter, and means providing for the utilization of available energy of the by-passed secondary flow elastic fluid and including the junction of by-passed secondary flow elastic fluid with the main flow between preceding and succeeding blade rows.

3. In an elastic-fluid turbine, means including blades of foil section having well-rounded inlet edges defining curved flow passages, said blades having circumferentially-abutting root and spacing portions for closing the passages at one end, the constrained curved fluid flow in said passages setting up higher pressure at the concave face of each passage than that at the convex face thereof and which pressure difference induces secondary flow along the concave face towards the ends of the passage, means including openings formed in the closed passage ends for by-passing secondary flow at the closed passage ends to minimize the re-entry of elastic fluid adjacent to the convex faces at such ends into the profile flow and substantially at right angles to the latter, and means providing for the utilization of available energy of the by-passed secondary flow elastic fluid and including the junction of by-passed secondary flow elastic fluid with the main flow between preceding and succeeding blade rows.

4. In an elastic-fluid turbine, a row of blades of foil section having well-rounded inlet edges and defining curved flow passages, said blades having circumferentially-abutting root and spacing portions, the constrained curved fluid flow in said passages setting up higher pressure at the concave face of each passage than that at the convex face thereof and which pressure difference induces secondary flow along the concave face towards the ends of the passage, means including a port formed in the root and spacing portion of each passage to afford communication between the closed passage end and the space at the discharge side of the blade row for by-passing secondary flow at the closed passage ends to minimize the re-entry of elastic fluid adjacent to the convex faces at such ends into the profile flow and substantially at right angles to the latter, and means including passages providing for by-passed secondary flow elastic fluid entering the space between preceding and succeeding blade rows for junction with the main flow.

5. In an elastic-fluid turbine, means including successive rows of blades defining curved flow passages closed at at least one end, the constrained curved fluid flow in said passages setting up higher pressure at the concave face of each passage than that at the convex face thereof and which pressure difference induces secondary flow along the concave face towards the ends of the passage, and means for by-passing and supplying to a succeeding blade row elastic fluid of secondary flow at closed passage ends to minimize its re-entry adjacent to the convex faces at such ends into the profile flow and substantially at right angles to the latter.

6. In an elastic-fluid turbine, means including successive rows of blades of foil section having well-rounded inlet edges, said blades having circumferentially-abutting root and spacing portions for closing the blade passages at one end, the constrained curved fluid flow in said passages setting up higher pressure at the concave face of each passage than that at the convex face thereof and which pressure difference induces secondary flow along the concave face towards the ends of the passage, and means including ports formed in the root and spacing portions to afford communication between the closed ends of the passages and the spaces at the discharge sides of the rows of blades for by-passing elastic fluid of secondary flow to a succeeding row of blades to minimize the re-entry thereof adjacent to the convex faces at such closed ends into the profile flow and substantially at right angles to the latter.

7. In an elastic fluid turbine, means including blades of foil section having well-rounded inlet edges defining curved flow passages, said blades having circumferentially-abutting root portions for closing the passage at one end, the constrained curved fluid flow in said passages setting up higher pressure at the concave face of each passage than that at the convex face thereof and which pressure difference induces secondary flow along the concave face towards the ends of the passage, means for by-passing secondary flow steam away from the steam path at the root portions of the stationary blades, and means providing for the utilization of available energy of the by-passed secondary flow elastic fluid and including the junction of by-passed secondary flow elastic fluid with the main flow between preceding and succeeding blade rows.

WINSTON R. NEW.